MEMORY ORGANIZATION WHEREIN ONLY NEW DATA BITS WHICH ARE DIFFERENT FROM THE OLD ARE RECORDED

Filed Aug. 29, 1963 3 Sheets-Sheet 1

INVENTOR
WILLIAM F. LANDELL
BY Rene A. Kuypers
ATTORNEY 3,311,893
United States Patent Office
Patented Mar. 28, 1967

3,311,893

MEMORY ORGANIZATION WHEREIN ONLY NEW DATA BITS WHICH ARE DIFFERENT FROM THE OLD ARE RECORDED

William F. Landell, Ardsley, Pa., assignor to Sperry Rand Corporation, New York, N.Y., a corporation of Delaware Filed Aug. 29, 1963, Ser. No. 305,461
15 Claims. (Cl. 340—172.5)

This invention relates in general to the recording of information. It relates in particular to a technique wherein new information is not recorded unless it is different from the information already recorded.

Known mechanical prior art techniques to minimize creep (i.e., the increase in length of a magnetized section on a recording medium due to repeated pulsing) have not been entirely satisfactory. The mechanical schemes for mitigating creep, such as removing the magnetic material between adjacent bits along a plated wire, have shortcomings in that they require elaborate manufacturing techniques which are expensive and difficult to employ.

Another of the difficulties encountered in the use of plated magnetic wires as a recording medium has been that history effects are readily developed therein. History effects may be defined as a permanent set which is developed in a plated magnetic wire by remagnetizing a certain bit location thereon many times in succession in one direction. As a result of successive recording in the same direction, the following effect has been observed; if a certain bit position along the plated wire is successively magnetized as a binary "one" and afterwards it is required to read out this "one" information, a certain magnitude voltage will be detected by an appropriate electronic device. On the other hand, after remagnetizing a certain bit position as a binary "one" over many cycles and afterward the same bit position is magnetized as a binary "zero," then the voltage detected by the abovementioned circuitry during a read out will not have the same amplitude (opposite polarity) as the read out of the binary "one."

The history effect problem as discussed above is particularly serious in the operation of a digital computer, since the latter functions by using discrete voltage pulses. In the event that these voltage pulses lose amplitude or are not well defined, there is a tendency for the computer to produce spurious results and hence lose accuracy.

It is therefore an object of this invention to provide an improved data memory device.

It is a further object of this invention to provide a memory system having an improved organization.

It is a further object of this invention to provide improved logical circuitry which will minimize the effect of creep in magnetic thin films.

It is still further an object of this invention to provide improved logical circuitry which will enable a thin film memory to achieve high packing density.

It is still a further object of this invention to provide improved logical circuitry which incorporates a READ-WRITE cycle.

It is another object of this invention to provide a memory device which is relatively efficient to operate It is yet another object of this invention to provide a memory device wherein information is not written into the same memory location where such information, at such write times, is already stored.

It is also another object of this invention to overcome history effects in recording on a continuous magnetic medium.

In accordance with a feature of this invention, there is provided logical circuitry for use with a memory device wherein the WRITE function of the memory is always preceded by a READ function. Accordingly, the WRITE operation of the memory is contingent upon the results obtained during the READ function. As a consequence, prior to writing any word into a memory location or address, the contents of the memory word in the same location is first read out of the memory and then compared bit by bit with the new word to be written. Any of the binary bits of the new word that agree with the binary bits of the previously stored word are not re-recorded. On the other hand, those bits of the new word that differ from those of the previously stored word are recorded.

In accordance with the above feature of this invention, the phenomenon of creep in magnetic thin film is materially reduced. The presence of creep in magnetic thin films, explained in more detail hereinafter, is reduced by avoiding the re-recording of information already present in a memory location. It has been found that the unnecessary re-recording of binary bits of information that are already present in the recording medium causes a magnetized bit to grow in length and eventually interfere with and alter the contents of an adjacent bit position. By means of the READ-WRITE cycle provided by the instant invention, no magnetized bit position is re-magnetized unless it is necessary to do so.

In accordance with another feature of this invention, a memory device of high packing density is obtained. By means of the READ-WRITE cycle provided by the improved logical circuitry of this invention, it is now possible to arrange the magnetized bits along a thin film-plated wire memory much closer together, thereby providing a memory device of high packing density and overall compact design.

The novel features that are considered characteristic of this invention are set forth with particularity in the appended claims. The invention itself, however, both as to its organization and method of operation, as well as additional objects and features thereof, will best be understood from the following description when considered in conjunction with the accompanying drawings, wherein:

Figures 1, 2:
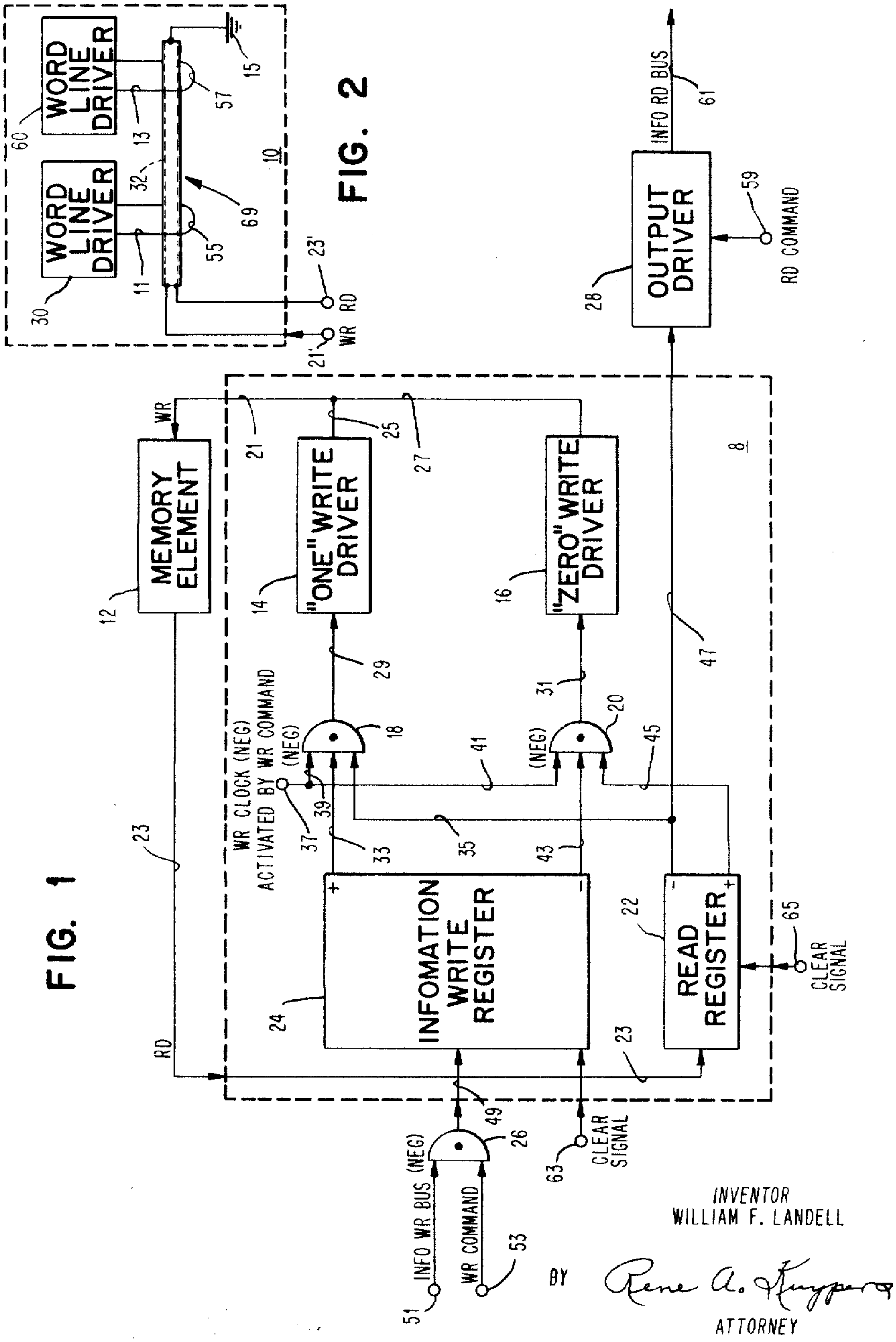
FIGURE 1 is the logical circuitry used in conjunction with a conventional memory element to provide the novel READ-WRITE cycle of the instant invention.
FIGURE 2 is a detailed view of a memory element comprising a magnetic thin film plated on a wire substrate.

The logical circuitry of this invention comprises components all of which are well known in the digital computer art and therefore the details of these components will neither be described in the specification or shown in the drawings. In addition, certain explanatory matter will be set forth which will make the description of the present invention easier to follow. In the logical circuitry of the present invention, three gate devices are employed. These gate devices in the preferred embodiment are negative AND gates, and it should be understood that these AND gates perform an AND function in response to having their input circuits simultaneously receiving negative signals. In addition, these AND gates perform an inversion function, and in response to having all their input circuits subjected to negative signals, provide a positive output sgnal. Such a device can properly be labeled a negative NAND gate, but in the specification, will be referred to as an AND gate. The logical circuitry of this invention also utilizes an information register and a read register, both of which can be flip-flop type devices. The information register is set in response to a positive input signal while negative input signals have no effect. On the other hand, the read register is set in response to a negative signal and positive input signals have no effect thereon. Write drivers respond to positive input signals and provide output current of the proper polarity for recording binary information onto a recording medium. It should also be understood that after each recording or read only cycle, the information write register and the read register are cleared or reset by a signal on "clear" lines, and a write clock signal is generated in response to a write command signal.

The present system is arranged so that a first AND gate is adapted to receive two input signals, namely, a binary signal on an information bus and a write command signal. The first AND gate transmits a single output signal which in turn is transmitted to the input terminal of an information write register. The information write register is either set or remains reset depending upon the polarity of the information signals (i.e., whether a binary one or zero is present at the information write bus) received by the first AND gate. For example, only a negative signal (i.e., binary zero) on the information bus will set the information register (or place the register in a zero state) whereas a positive signal (i.e., a binary one) will leave the information register in the reset or the quiescent state (i.e., the binary one state).

The information write register has two output signals the polarities of which are determined by whether the register is set or reset. The two output signals of the information register are transmitted respectively to the first input terminals of second and third AND gates.

A magnetic memory element, which may consist of a planar thin film, thin film-plated wire or ferrite core (as well as one of the other conventional type magnetic memory elements) is connected to the logical circuitry provided by this invention by means of read and write terminals. The read termnial of the memory element is connected to the input terminal of the read register, which is incorporated as a part of the logical circuit. The read register may be either set or remain reset in accordance with the polarity of the signal received at its input terminal during the read out of the memory element. The read register has two output terminals with each one being connected respectively to an associated second input terminal of either the second and third AND gates. In addition, the second and third AND gates also have a negative timing signal from a clock pulse generator applied to respective third input terminals thereof and this negative timing signal occurs only when a write command signal is present at the first AND gate. The outputs of the second and third AND gates are connected respectively to a binary "one" write driver and binary "zero" write driver. The outputs of these two drivers are connected to the write terminal of the memory element.

In operation, the logical circuitry of the instant invention always requires that a READ operation precede a WRITE operation. Assuming that the memory is word organized, the information stored on a memory element of the thin film-plated wire type, for example, is read out by energizing a required word line. The binary information read out of the memory element and received by the read register either sets it or allows it to remain reset in accordance with the polarity of the signal read out. As mentioned earlier, the read out of a binary zero from the memory element sets the read register thereby providing a positive signal to one of the three inputs of the third AND gate (i.e., the AND gate connected to the zero write driver), and a negative signal to one of the three inputs of the second AND gate (i.e., the AND gate connected to the one write driver).

Just prior to the moment that the information is read from the memory element, a write command signal is initiated. This signal together with the binary information present on the write bus, comprise the respective input signals to the first AND gate. The output signal of the first AND gate is transmitted to the input line of the information write register. It will be recalled that the information write register is set in response to a positive input signal from the first AND gate and is not disturbed in response to a negative input signal therefrom.

Thus, if a negative signal is transmitted on the information bus indicating that the system wants to record a binary zero, and the write command signal is present (which is also of negative polarity) to enable such a recording, the first AND gate is fully conditioned and thereby produces a positive output pulse which sets the information write register. When the information write register is set it provides a positive signal on the output lead which is transmitted to a second input terminal of the second AND gate thereby inhibiting the latter gate and the "one" write driver. Therefore it should be evident that if a binary zero has been read out of the memory element and simultaneously a binary zero signal appears on the information bus to be recorded, there can be no recording of other binary information (i.e., a binary one), since the "one" write driver will be inhibited. The other two input terminals of the second AND gate have negative signals applied thereto consisting of a negative timing signal from the clock pulse generator and a negative signal from the setting of the read register but these signals cannot fully condition the second AND gate in view of the positive signal applied to the second input terminal as just described.

As discussed briefly above, one of the input signals transmitted to the third AND gate (i.e., the AND gate whose output is connected to the zero write driver) is a positive signal supplied by the read register. It will be recalled that the read register is designed to provide a positive signal when a negative signal (binary zero) has been read out of the memory element. The positive signal to the third input of the third gate inhibits the gate. Therefore, it is evident that if a binary zero is read out of the memory element and a binary zero is present on the information write bus to be recorded, the third AND gate and therefore the "zero" write driver are both inhibited from enabling a re-recording of the binary zero information.

However, had the memory element produced a binary one signal during the read out and the information write bus had required that a binary zero be written into the memory, the logical circuitry generally discussed above and which will be discussed in more detail hereinafter, would provide that the zero write driver be energized whereas the one write driver would be blocked.

Referring now to the drawings, it can be seen that the preferred embodiment of the memory element 12 of FIGURE 1 is shown in greater detail within the dotted enclosure 10 of FIGURE 2. The dotted enclosure 10 depicts a thin film, plated wire element 69 comprising a five mil diameter beryllium copper substrate 32. The substrate 32 is electroplated with approximately a 10,000 Angstrom thickness of a nickel-iron alloy (80% nickel-20% iron). The alloy coating is electroplated in the presence of a circumferential magnetic field that establishes a uniaxial anisotropy axis at right angles (i.e., around the circumference) to the length of the wire. The uniaxial anisotropy establishes an "easy" and "hard" direction of magnetization so that a magnetization vector of the thin film is thereby established, which is oriented in one of the two equilibrium positions along the "easy" axis, thereby establishing two bistable states necessary for binary logic applications. Although a nickel-iron alloy is used in the preferred embodiment, other material can be used, as well as other techniques to establish an "easy" and "hard" direction of magnetization.

Examining FIGURE 2 further it can be seen that placed substantially perpendicular and in juxtaposition to the plated wire 69 are word lines 11 and 13. The single-turn word lines 11 and 13, respectively connected to word line drivers 30 and 60, are adapted to energize the word lines during either the read or write cycle of a computer operation. The word lines 11 and 13 although depicted as being single-turn may be fabricated into a multi-turn as well as a flat configuration (i.e., open ended). A multi-turn word line may be desirable whenever it is required to obtain extra coupling between the word line and the memory element. The word lines in a preferred embodiment are typically 20 mils wide and placed on 40 mil centers. It should be understood that where the word lines 11 or 13 are of a flat configuration, one end could be grounded and the other end connected to a respective word line driver 30 or 60, which are returned to ground. In a similar manner, the plated wire 69 is shown grounded at terminal 15 in order to show a completed circuit for connection to the logical circuit 8 (FIGURE 1). It should also be understood that the read register 22 as well as the "one" write driver 14 and "zero" write driver 16 within the logical circuit 8 are accordingly grounded.

A bit position whereat binary information is stored is defined as the intersection of a bit wire with a word line. Thus, the word lines 11 and 13 (FIGURE 2) define two adjacent bit positions with respect to the plated wire 69.

As previously mentioned, creep is defined as the increase in length of a magnetized area in a magnetizable medium which in the instant case is a Permalloy film (iron-nickel) of small thickness. It has been found that creep occurs during the period when new information is being written onto the recording medium, such as a thin film-plated wire memory element. The creep problem is particularly serious in the memory of a digital computer, since a digital computer functions, that is, adds, subtracts, multiplies, etc., by using discrete voltage pulses. In the event that these voltage pulses lose amplitude or are not well defined, there is a tendency for the computer to lose accuracy and hence produce spurious results. It is therefore imperative that a memory element of a computer produce voltages of the same amplitude and definition.

When the memory element 12 is of the thin film-plated wire type shown in the dotted enclosure 10, there is a tendency due to re-recording onto a memory element, for the bit position 55, for example, to creep or elongate into the bit position 57. It is believed that the phenomenon of creep occurs under the following circumstances.

Assume, for example, that the bit position 55 is magnetized to produce a binary one and the bit position 57 is magnetized to produce a binary zero. In addition, it should be understood that a bit position of thin film has a plurality of molecules of magnetizable material each of which molecules is characterized by a magnetization vector and that for simplicity of communication, hereinafter the magnetizable material will be referred to as having magnetization vectors rather than molecules characterized by magnetization vectors. The magnetization vectors at the bit position 55 are all oriented along the "easy" axis of magnetization in one direction, and the magnetization vectors comprising the bit position 57 are all oriented in the opposite direction along the "easy" axis. However, the orientation of the magnetization vectors between the two bit positions 55 and 57 are oriented in a haphazard manner so that some of the magnetization vectors are oriented along the "easy" axis as "ones" and some of the magnetization vectors are oriented as "zeros."

During the write cycle of the computer operation when new information is to be written into a particular address of the memory, a bit current of the correct polarity is sent down the plated wire 69 in coincidence with current in the word line 11, for example. The current in the word line shifts the magnetic vector toward the "hard" axis, which is the neutral position between the "one" and "zero" "easy" axis. The presence of the current in the plated wire 69 tilts (i.e., provides the necessary additional movement) the magnetization vectors toward the desired (one or zero) "easy" axis orientation, so that after the current is turned off and both the word line 11 and the plated wire 69 return to the quiescent state, the magnetization vectors fall in the desired "one" or "zero" direction. The magnitude of the bit current in the plated wire 69 required for the write operation is small compared to the current in the word line 11. The current in word line 11 must provide enough energy (flux) to rotate the magnetization vectors to almost 90 degrees from the "easy" axis while the bit current flux field is only required to steer the magnetization vector through the 90 degree position.

In the event that the bit position 55 has its magnetization vectors already oriented along the "one" easy axis and a prior art system attempts to write a new word in a memory address, which also requires that the bit 55 be a binary "one," the binary one will be re-recorded. In the process of re-recording the "one" at the bit position 55, there is an effect on a next adjacent vector (i.e., a single magnetization vector in the group mentioned before as having a haphazard arrangement) between the bits 55 and 57, which may not be oriented along the "easy" axis in the "one" direction to likewise be rotated from the "easy" toward the "hard" axis of magnetization. In the case of the magnetization vectors at the bit position 55, the termination of the current in the bit wire 69 merely causes the magnetization vectors to fall back into place along the "easy" axis. However, the next adjacent single vector, which may or may not be of opposite orientation between the two bit positions 55 and 57, would tend to be re-oriented along the "one" "easy" axis when the current in the bit line 69 is removed.

In other words as an area of thin film (bit position) has its vectors oriented in the direction of the "hard" axis, the area being a flux source thereby affects the adjacent areas. Hence, the flux generated by the area tends to orient an adjacent unaligned vector in the direction of the "hard" axis. It will be recalled that the vectors are not oriented at the 90° "hard" axis when both the bit signal and the word signal are present, but instead lie on the "one" or "zero" side of the 90° "hard" axis in accordance with the particular bit signal that has been applied. Consequently, the affected adjacent vector, when it becomes oriented by the bit position flux, lies close to the "hard" axis on the particular side of the 90° "hard" axis whereat the bit position vectors are lying. A vector lying along the "hard" axis or reasonably close thereto is in an unstable state when the flux bias, which positioned it there, is removed. Hence, when the signals on the word line and on the bit line are removed, the bit position vectors will fall back in the "easy" axis direction of the bit signal applied. Likewise, the unstable adjacent vector which has been affected by the bit position vectors will also fall back in this direction, and accordingly the bit position flux has increased the length of the magnetized area. When a "one" is re-recorded, as in our previous example, the foregoing process is repeated, and the magnetized area or bit position is lengthened even more. Accordingly, the bit position creeps in length until eventually it affects the adjacent bit position 57, in our example, and the undesirability of such creeping is obvious.

It can thus be seen that in a worse case condition, that is, when the bit position 55 has its magnetization vectors oriented along the "easy" axis to produce a binary one and the bit position 57 to produce a binary zero, the bit position 55 could grow in length so that eventually it will begin to interfere with the bit position at 57. If the re-recording process associated with bit position 55 were to continue over a period of time, the magnetization vectors comprising a binary zero at the bit position 57 would similarly become oriented one by one like those of bit 55. In this case, the magnetic strength of the bit position 57 would become weakened and during the read out of bit position 57 a signal of reduced amplitude or possibly reversed polarity would result. By preventing the re-recording of information already stored in a memory location, the tendency of a bit position to creep or grow in length is materially reduced.

The logical circuitry 8 (FIGURE 1) associated with a conventional memory element 12 will be explained by first proceeding through an abbreviated computer write cycle which will be explained in more detail hereinafter. The "one" write driver 14 or the "zero" write driver 16 are energized as required, thereby poducing a binary one or binary zero signal on the output terminals 25 or 27. The required binary one or binary zero write signals are transmitted by the line 21 to the memory element 12 and recorded thereon. Referring to the more detailed thin film-plated wire memory element 10 (FIGURE 2) in conjunction with the logical circuit 8, the energizing of the binary one or binary zero write driver supplies steering current to the plated wire 69 via the connecting line 21' (FIGURE 2) for recording. This steering current in coincidence with the current in the word lines 11 or 13 orients the magnetization vectors at the bit positions 55 or 57 along the "easy" axis to provide either a binary one or zero as required. The polarity of the steering current determines whether a binary zero or binary one will be recorded on the plated wire 69. Reading takes place by energizing a word line driver such as 30 thereby causing a voltage to be induced on the plated wire 69 that is transmitted by the read line 23' to appropriate read circuitry.

Assume that the zero write driver or recorder 16 (FIGURE 1) has been energized, thereby causing a binary zero to be stored (i.e., recorded) as abit of binary information on the memory element 12. Further assume that it is now required by the computer to write a binary zero in the same bit position of the memory element 12. Before the write cycle can begin, it is necessary that the information previously recorded in the memory element 12 first be read out via the read line 23. The signal transmitted on the line 23 is connected to the input of the read register 22 thereby setting or resetting the read register 22, which conventionally includes a sense amplifier, in accordance with the polarity of the binary signal read out (i.e., a binary zero has a positive polarity and a binary one has a negative polarity). Thus, if the signal read out of the memory element 12 is a binary zero, the read register 22 is set and the read register 22 produces two output signals whose polarities are indicated in FIGURE 1 (i.e., the indicated signal polarities in FIGURE 1 of the read register 22 and the information register 24 are for the set conditions). As can be seen in FIGURE 1 a negative signal is present on the output lead 35 and a positive signal is present on the output lead 45. If a binary one is read out of the memory element 12, register 22 is reset and opposite polarity voltages from that shown in FIGURE 1 are produced. The READ cycle of the logical circuit of FIGURE 1 will be discussed further with respect to the read register 22 hereinafter.

Figure 3:
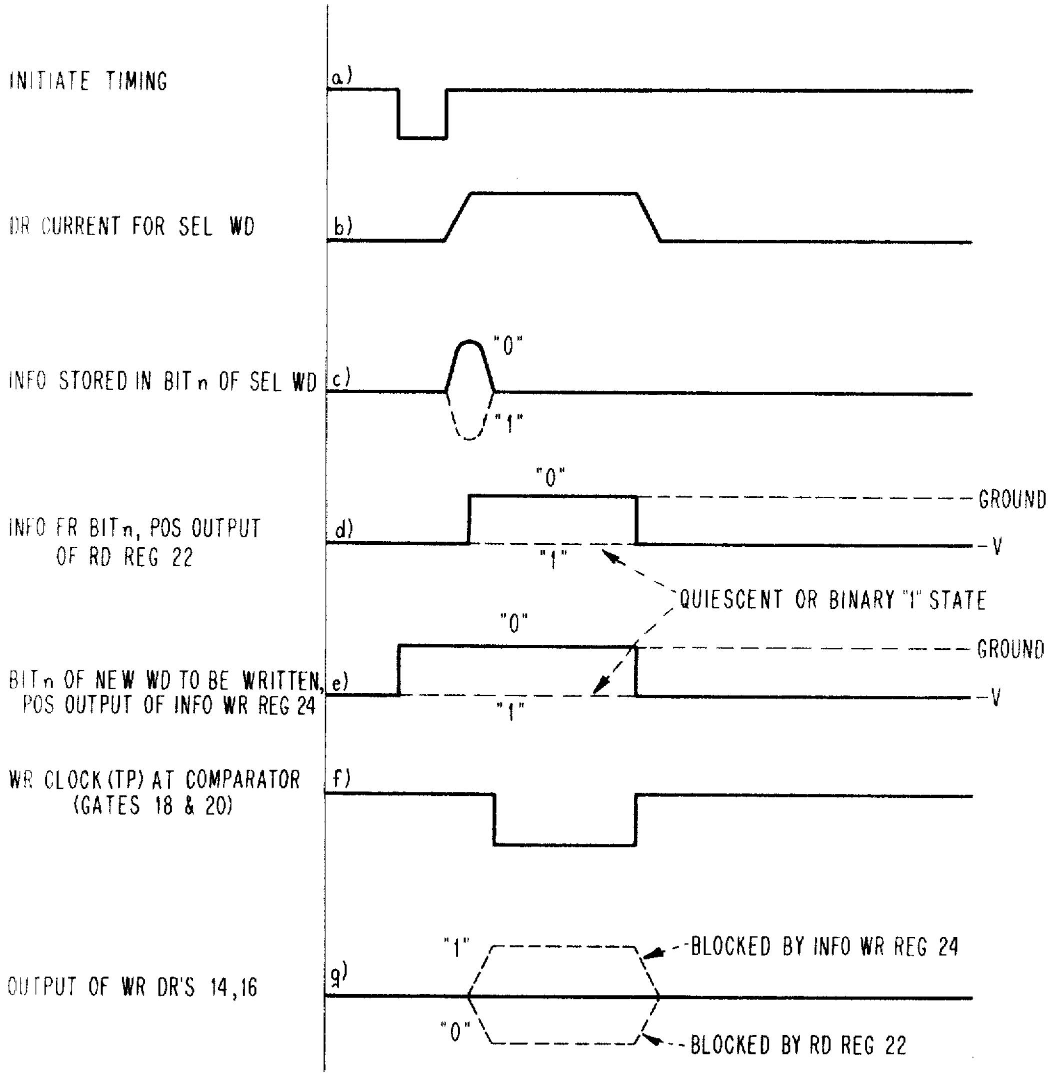
FIGURE 3 is a timing diagram of various voltage pulses occurring during the operation of the logical circuitry of FIGURE 1.

The timing associated with the READ-WRITE cycle of the logical circuit shown in FIGURE 1 is depicted in FIGURE 3 wherein FIGURE 3(*a*) shows the Initiate Timing Signal of the logical circuit 8. The Initiate Timing Signal shown in FIGURE 3(*a*) is a write command signal present at terminal 53 of the AND gate 26 and also causes a somewhat delayed timing signal at terminal 37 to be generated. FIGURE 3(*b*) indicates that after the conclusion of the Initiate Timing Signal, the drive current signal required for read out of the memory element 12 is provided. In the case of the thin film-plated wire memory embodiment of 10 (FIGURE 2), the signal of FIGURE 3(*b*) is applied by means of the word line drivers 30 or 60 to the respective word lines 11 or 13. The positive or negative output signal, depending upon whether a binary zero or a binary one, respectively, as read out on the read line 23 of memory element 12 or read line 23' of memory 10 is shown in FIGURE 3(*c*). This last signal occurs during the rise time of the drive current shown in FIGURE 3(*b*). It is the positive voltage shown in FIGURE 3(*c*) that sets the read register 22.

It will be recalled that the AND gates 18, 20 and 26 in the preferred embodiment are negative AND gates, that is, the signals applied to the input terminals must all be negative before a positive output gating signal is obtained. The AND gates may also be considered as a comparator since it will gate a signal only if the input signals are properly conditioned. Thus, insofar as this recording circuit is concerned it is not possible to accomplish a computer READ only operation of the information stored on the memory element 12 because AND gates 18 and 20 would be inhibited. The AND gates would be inhibited since if there were no write command signal there would be no negative timing signal from the clock pulse generator at the terminal 37 at the time that the read output signal arrived at the gates 18 and 20. However, a READ only operation can be accomplished to be used with the remainder of the system. For instance, the positive pulse or binary zero read out of the memory element 12 would set the read register 22 thereby producing a negative signal on the connecting line 47. This latter signal in conjunction with a negative READ command signal at terminal 59 causes the non-inverting output driver 28 to produce a negative signal on the information read bus 61, which would be indicative that a binary zero has been read out of the memory.

Returning to the READ-WRITE cycle of the computer, it has been assumed that a binary zero has been read out of the memory element 12 thereby setting read register 22. A binary zero is also assumed to be present on the information write bus 51 and is to be recorded. A negative write command signal at terminal 53 in conjunction with the negative signal at terminal 51 fully conditions the AND gate 26 and produces a positive signal along the output line 49. The positive signal on the connecting line 49 causes the information write register 24 to be set. The output signals at terminal 33 of the information register 24 when it is in a set condition are shown in FIGURE 3(*e*). In a preferred embodiment, the positive signal is at ground potential and the negative signal is at a potential below ground. As mentioned earlier, the write command signal at terminal 53 of AND gate 26 also activates the timing signal from the clock pulse generator connected at terminal 37. The setting of the information write register 24 causes the terminal 33 to be positive thereby inhibiting the AND gate 18. As a consequence, the binary zero to be recorded on the information write bus 51 inhibits AND gate 18 as well as the "one" write driver 14. Simultaneously, at the terminal 43 of the information write register 24 there appears a negative signal, which is applied to the center input of the AND gate 20 at the same time that a negative timing pulse from the clock generator is applied along the connector 41 to the top input of the AND gate 20. As previously stated, the read register 22 has been set by the read out of a binary zero from the memory element 12 thereby causing the terminal 45 to be positive. The positive output signal of the read register 22 is shown in FIGURE 3(*d*). As a consequence, the AND gate 20 is also inhibited as is the "zero" write driver. It is readily apparent from the above discussion that a binary zero to be recorded from the information write bus 51 is not rerecorded into the memory element 12 if a binary zero is already stored therein. The signal timing which effects the blocking of the write drivers is shown in FIGURE 3(*g*).

The timing signal for the write operation from the clock pulse generator applied at terminal 37 is shown in FIGURE 3(*f*). The timing of the READ before WRITE cycle of this invention is apparent by a careful comparison of the READ signal on FIGURE 3(*d*) from the read register 22 with the timing signal on 3(*f*) during which WRITING occurs. It is evident that the signal from the read register 22 is slightly ahead in time of the clock signal at terminal 37 from the clock pulse generator.

Had it been required to write a binary one into the memory element 12, a positive signal would have been applied to the information write bus 51 of the AND gate 26. The AND gate 26 would therefore be inhibited and the information write register 24 would not have been set and the polarity of the voltages would be reversed so that line 33 would be negative (i.e., assume the quiescent voltage along the dotted line shown in FIGURE 3(*e*)) and the line 43 would be positive. The positive signal along line 43 is sufficient to inhibit the negative AND gate 20 as well as the "zero" write driver 16.

The write command signal at the terminal 53 of the AND gate 26 also activates the clock pulse generator to produce a negative timing signal at the terminal 37 and along the connecting line 39 to the AND gate 18. Since the read out of a binary zero from the memory element 12 sets the read register 22 thereby producing a negative signal at the input line 25 (i.e., the negative or quiescent signal shown in FIGURE 3(*d*)) of the AND gate 18, the AND gate would be fully conditioned since the three signals present along 33, 35 and 39 would all be negative. The fully conditioned AND gate 18 would provide a positive output signal at its output. line 29 thereby energizing the binary one write driver 14. An output signal would be produced at the terminal 25 and the write terminal 21 of the memory element 12, thereby causing a binary one to be recorded thereon. With respect to the thin film-plated wire memory element 10 (FIGURE 2), the energizing of the "one" write driver 14 causes a current of positive polarity to flow into the write terminal 21' and into the bit line 32. Since there have been a simultaneous energizing of the word line 13, for example, by the world line driver 60, the magnetization vectors at the bit position 57 would be steered along the "easy" axis to record a bianary one. The energizing of the zero write driver would cause a current of negataive polarity to flow into the write terminal 21'. It is therefore readily apparent that the logical circuit shown in FIGURE 1 permits either the binary one write driver or binary zero write driver to be energized only in the event that the information already stored in the memory element is different from that which is to be recorded. After the recording cycle has been completed, the information write register 24 and the read register 22 are cleared or reset by signals on the clear lines 63 and 65, respectively. It should be understood that a clear signal would also be applied to both registers after a read only computer operation.

The explanation of the logical circuitry of FIGURE 1 has been made with regard to a memory element 12, which has stored only one bit of binary information. This has been done in the interest of simplicity and ease of understanding. However, as a practical matter there would be a plurality of memory elements such as element 12 and on each element there could be a plurality of bits each representing a single binary bit of a multibit word address of a digital computer. It should be further understood that a digital computer may have anywhere from one to several thousand word addresses depending upon the size of the installation. This invention is therefore readily adaptable so that instead of reading only one binary bit out of a memory element, a plurality of binary information can be read out of the memory in parallel. Parallel read out of memory is required whenever it is necessary to obtain high speed performance from a digital computer. If therefore a digital computer requires a word address to have eight bits per word, the circuitry of FIGURE 1 would be used with each of the eight bits.

The above discussed parallel arrangement is shown in

Figure 4:
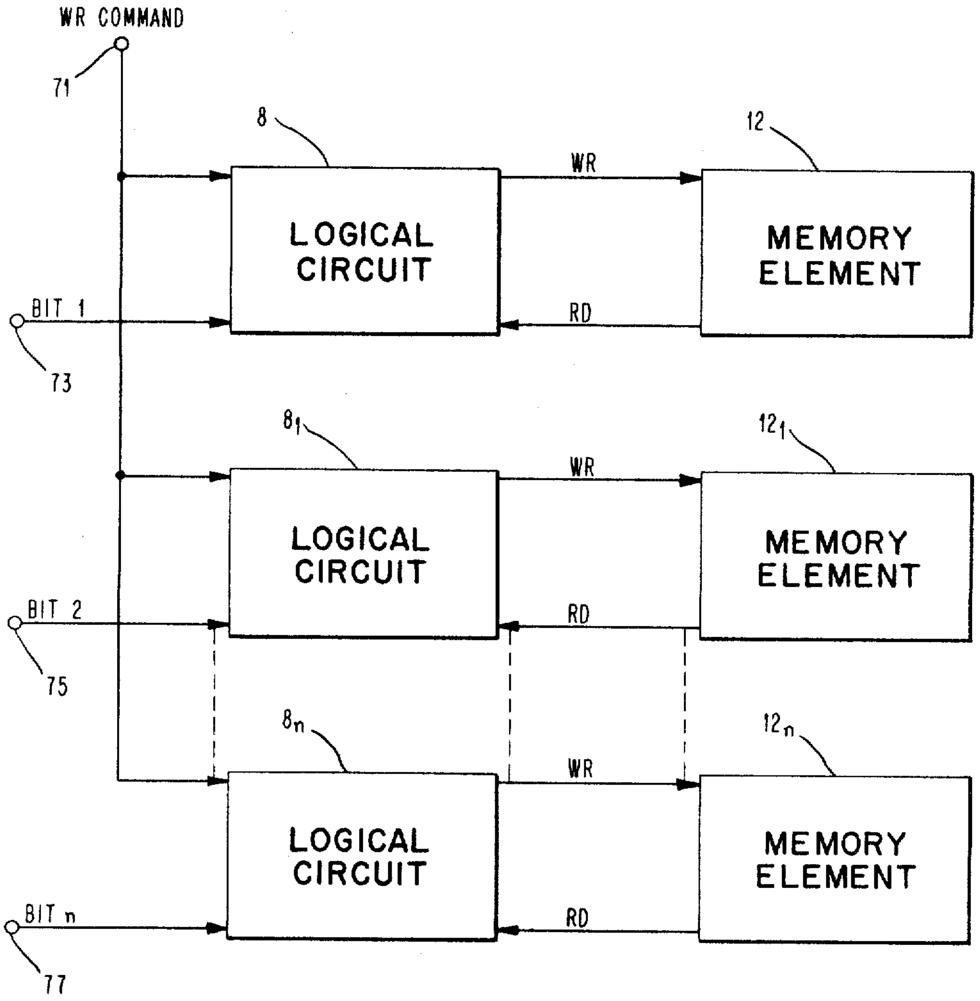
FIGURE 4 is a block diagram of an embodiment depicting a plurality of memory elements each of which is used in conjunction with a logical circuit provided by the instant invention.

FIGURE 4 in block diagram form. The logical building block 8, $\mathbf{8_1}$ and $\mathbf{8_n}$ and the memory elements 12, $\mathbf{12_1}$ and $\mathbf{12_n}$ are of like construction to logical building block 8 and memory element 12 of FIGURE 1. Therefore, as the bits of the word are read out of the memory elements 12, $\mathbf{12_1}$ and $\mathbf{12_n}$ in parallel, they would be compared bit by bit with the respective bits of the new word, namely, bits 1, 2 and *n* applied to the input terminals 73, 75 and 77 within the logical circuits 8, $\mathbf{8_1}$ and $\mathbf{8_n}$. This would take place during a write command signal applied to terminal 71. Thus, if a bit in a particular location for a word previously stored in the memory is the same as a bit in the word to be written into the memory, there is no re-recording of that binary information. On the other hand, if the information stored in a particular bit location is compared with the bit of the word that is to be writen into he memory and is found different then the proper write driver is energized to record the new information. In view of this efficiency of operation, the presence of creep in thin film can be materially reduced.

In summary, this invention relates to a logical circuit used in conjunction with digital computer memory device wherein creep in thin film-plated wire memories is substatnially reduced. This is accomplished by only recording different information. Thus, before any new information is written into the memory, the information that was previously stored therein is read out and compared with the new. By this method, when the bit of an old word is compared with the same bit of a new word and it is found the same, there is no re-recordding of that particular piece of information. Alternatively, if the bit of the old word is different from the same bit of the new word, then the proper write deriver is energized in order to record the new information.

In addition, this invention virtually eliminates history effects in recording on a continuous magnetic medium. This is accomplished since the same information is not re-recorded at a specific location on the magnetic medium.

Obviously, many modifications and variations of the present invention are possible in the light of the above teachings. It is therefore to be understood that within the scope of the appended claims, the invention may be practiced otherwise than as specifically described.

The embodiments of the invention in which an exclusive property or privilege is claimed are defined as follows:

1. A memory organization comprising:
   (a) a plated magnetizable wire having a magnetic coating, said coating having the property of uniaxial anisotropy;
   (b) a conductive strap positioned substantially orthogonal to said wire, the intersection of said wire and said strap comprising a memory bit position;
   (c) means to energize said conductive strap during a memory read-out or record cycle;
   (d) means for providing current in a first, or in the alternative, in a second direction to said wire during a record cycle coincidentally with the energizing of said strap;
   (e) means to sense previously recorded binary information at said bit position when said strap is energized for a read cycle;
   (f) means to provide new binary information for recording at said bit position;
   (g) means for making a comparison between said new binary information to be recorded and said previously recorded binary information which has been sensed;
   (h) said comparison means applying a first signal to block said means for providing current in a first, or in the alternative, in a second direction when said binary information and said previously recorded binary information are the same;
   (i) said comparison means applying a second signal to said means for providing current in a first, or in the alternative, in a second direction when said new binary information and said previously recorded binary information are different.

2. The combination comprising:
(a) a data storage means;
(b) conductor means positioned in juxtaposition to said data storage means for applying a first magnetic field at said data storage means;
(c) means for providing a second magnetic field at said data storage means;
(d) means to sense previously recorded information at said data storage means which has been read out by applying said first magnetic field thereto;
(e) means for providing new information for recording on said data storage means;
(f) means for making a comparison between said new information to be recorded and said previously recorded information which has been sensed;
(g) said comparison means applying a first output signal to block said means for providing said second magnetic field at said data storage means when said new information and said previously recorded information are the same;
(h) said comparison means applying a second output signal to unblock said means for providing said second magnetic field at said data storage means when said new information and said previously recorded information are different, said second magnetic field being applied in coincidence with the applying of said first magnetic field.

3. A memory organization comprising:
(a) a data storage means;
(b) conductor means positioned in juxtaposition to said data storage means;
(c) means for energizing said conductor to generate a first magnetic field at said data storage means;
(d) means for providing a second magnetic field at said data storage means which is orthogonal and in a first direction with respect to said first magnetic field;
(e) means for providing a second magnetic field at said data storage means which is orthogonal and in a second direction with respect to said first magnetic field;
(f) means to sense previously recorded information at said data storage means which has been read out by generating said first magnetic field thereat;
(g) means to provide an information signal indicative of whether a binary one or binary zero is to be recorded on said data storage means;
(h) means for making a comparison between said new binary information to be recorded and said previously recorded binary information which has been sensed;
(i) said comparison means applying first signal to block said means for providing said second magnetic field which is in a first direction when said information signal to be recorded is a binary one and said previously sensed information is a binary one;
(j) said comparison means applying a second signal to unblock said means for providing said second magnetic field which is in a first direction when said information signal to be recorded is a binary one and said previously sensed information is a binray zero, said second magnetic field being applied in coincidence with said first magnetic field;
(k) and in the alternative, said comparison means applying a first signal to block said means for applying said second magnetic field which is in a second direction when said information signal to be recorded is a binary zero and said previously sensed information is a binary zero;
(l) said comparison means applying a second signal to unblock said means for providing said second magnetic field which is in a second direction when said information signal to be recorded is a binary zero and said previously sensed information is a binary one, said second magnetic field being applied coincidentally with said first magnetic field.

4. A memory organization comprising:
(a) a data storage means comprising a substrate having a ferromagnetic coating, said coating having the property of uniaxial anisotropy;
(b) conductor means positioned in juxtaposition to said data storage means;
(c) means to energize said conductor to provide a first magnetic field at said data storage means;
(d )means to provide a second magnetic field at said data storage means;
(e) means to provide a third magnetic field at said data storage means;
(f) means to sense previously recorded information at said data storage means which has been read out by applying said first magnetic field thereto;
(g) means to provide new binary information signal for recording on said data storage means;
(h) means for making a simultaneous comparison between said new binary information which is to be recorded and said previously recorded binary information which has been sensed;
(i) said comparison means applying first signal to block said means to provide a second magnetic field at said data storage means when said information signal to be recorded is a binary one and said previously sensed information is a binary one;
(j) said comparison means applying a second signal to unblock said means to provide a second magnetic field at said data storage means when said information to be recorded is a binary one and said previously sensed information is a binary zero, said first and second magnetic fields being applied coincidentally;
(k) and in the alternative, said comparison means applying a first signal to block said means to provide a third magnetic field at said data storage means when said information signal to be recorded is a binary zero and said previously sensed information is a binary zero;
(l) said comparison means applying a second signal to unblock said means to provide a third magnetic field at said data storage means when said information signal to be recorded is a binary zero and said previously sensed information is a binary one, said first and third magnetic fields being applied coincidentally.

5. A memory organization comprising:
(a) a plurality of memory elements, each said element storing a portion of information;
(b) means to simultaneously read out all of the information stored on said elements during a read cycle, said last mentioned means also providing part of the write signal during a record cycle;
(c) means to sense all of the information read out of said respective memory elements;
(d) means to provide new information for recording on said respective ones of said plurality of memory elements;
(e) means to simultaneously record portions of said new information on respective ones of said plurality of memory elements by providing the remaining part of said write signal;
(f) comparator means;
(g) said comparator means including means to receive both said portion of old information which has been sensed and said portion of new information which is to be recorded on said respective memory elements;
(h) said comparator means applying a first signal to block said recording means from re-recording any said portion of new information which is identical to said previously stored portion of information;
(i) said comparator means applying a second signal to permit said recording means to record any said portion of new information which is different from said previously stored portion of information.

6. A memory organization comprising:
(a) a plurality of memory elements, each said element storing a portion of information;
(b) means to simultaneously read out all of the information stored on said memory elements during a read cycle, said last mentioned means also providing part of the write signal during a record cycle;
(c) read register means to sense said portions of information read out of said respective memory elements;
(d) information register means to provide a source of new information for recording on said respective ones of said plurality of memory elements;
(e) means to simultaneously record said portions of new information on respective ones of said plurality of memory elements by providing the remaining part of said write signal;
(f) comparator means to receive both previously recorded portions and new portions of information from said read and information registers respectively;
(g) said comparator means producing a first bias signal to block said recording means from re-recording any portion of said new information which is identical to said previously stored information;
(h) said comparator means producing a second bias to unblock said recording means from recording any portion of said new information which is different from said previously stored information.

7. The combination comprising:
(a) a data storage means for storing binary information;
(b) means for applying a first magnetic field to said data storage means;
(c) means to sense the binary information previously read out of said data storage means by applying said first magnetic field thereto;
(d) means for applying a second magnetic field to said data storage means;
(e) means for applying a third magnetic field to said data storage means;
(f) a source of new binary information signals to be recorded on said data storage means;
(g) a first AND gate;
(h) a second AND gate;
(i) said first and second AND gates including means to receive both said previously recorded information which has been sensed and said new information which is to be recorded on said data storage means;
(j) said means for applying a second magnetic field being blocked by an output signal from said first AND gate having a first polarity when said previously recorded information sensed by said read out of said storage means is a binary one and said new binary information signals to be recorded is a binary one;
(k) said means for applying a second magnetic field being unblocked by an output signal from said first AND gate having a second polarity when said previously recorded information sensed by said read out of said storage means is a binary zero and said new binary information to be recorded is a binary one, said first and second magnetic fields being applied coincidentally;
(l) and in the alternative, said means for applying a third magnetic field being blocked by an output signal from said second AND gate when said previously recorded information sensed by said read out of said storage means is a binary zero and said new binary information signals to be recorded is a binary zero;
(m) said means for applying a third magnetic field being unblocked by an output signal from said second AND gate when said previously recorded information sensed by said read out of said storage means is a binary one and said new binary information to be recorded is a binary zero, said first and third magnetic fields being applied coincidentally.

8. A memory organization comprising:
(a) a data storage means for storing binary information;
(b) means coupled to said data storage means to apply a first signal thereto;
(c) means to sense the binary information previously recorded on said storage means which has been read out by applying said first magnetic field to said data storage means, said means to sense having first and second output means;
(d) the value of said first output means assuming a first value and said second output means assuming a second value when a binary zero has been detected by said sense means;
(e) said second output means assuming said first value and said first output means assuming said second value when a binary one has been detected by said sense means;
(f) means to provide a binary one recording signal at said data storage means;
(g) means to provide a binary zero recording signal at said data storage means;
(h) a source of new binary information to be recorded on said data storage means, said source having first and second output means;
(i) the value of said source first ontput means assuming said first value and said second output means assuming said second value when a binary zero is to be recorded on said data storage means;
(j) the value of said source first output means assuming said second value and said second output means assuming said first value when a binary one is to be recorded on said data storage means;
(k) first AND and second AND gates;
(l) said first and second output values of said means to sense and said source of new binary information, respectively, being applied to said first AND gate;
(m) said second and first output values of said means to sense and said source of new binary information, respectively, being applied to said second AND gate;
(n) said first AND gate applying a first signal to block said means to provide a binary zero recording signal when said source of new information requires a binary zero to be recorded and a binary zero has been detected by said means to sense previously recorded binary information;
(o) said first AND gate applying a second signal to unblock said means to provide a binary one recording signal when said source of new information requires a binary one to be recorded and a binary zero has been detected by said means to sense previously recorded binary information, said binary one recording signal being applied in coincidence with the applying of said means to apply a first signal to said data storage means;
(p) and in the alternative, said second AND gate applying said first signal to block said means to provide a binary one recording signal when said source of new information requires a binary one to be recorded and a binary one has been detected by said means to sense previously recorded binary information;
(q) said second AND gate applying said second signal to unblock said means to provide a binary one recording signal when said source of new information requires a binary one to be recorded and a binary zero has been detected by said means to sense previously recorded information, said binary one recording signal being applied in coincidence with the applying of said means to apply a first signal to said data storage means.

9. The combination comprising:
(a) a data storage means for storing binary information;
(b) means to apply a first magnetic field in a first direction to said data storage means;
(c) means to apply a second magnetic field in a second direction to said data storage means;
(d) means to sense previously stored information recorded on said data storage means which has been read out by applying said first magnetic field to said data storage means;
(e) a source of new binary information for storing on said data storage means;
(f) means for comparing said previously recorded and said new information;
(g) said last mentioned means blocking with a bias signal said means to apply said second magnetic field to said data storage means when said new binary information and said previously recorded information are identical;
(h) said last mentioned means unblocking with a bias signal said means to apply said second magnetic field to said data storage means which is applied coincidentally with the generation of said first magnetic field, when said new binary information and said previously recorded information are different.

10. The combination in accordance with claim 9 wherein said data storage means comprises a ferromagnetic coating on a substrate, said coating having the property of uniaxial anisotropy.

11. The combination in accordance with claim 10 wherein said substrate is made of copper beryllium.

12. The combination in accordance with claim 11 wherein said substrate comprises a wire having a diameter on the order of 5 mils.

13. The combination comprising:
(a) a data storage means having an easy axis of magnetization;
(b) means to apply a first magnetic field orthogonal to said data storage means;
(c) means to apply a write pulse which generates a second magnetic field which is in the same direction as said easy axis;
(d) means to sense previously stored information recorded on said data storage means which has been read out by applying said first magnetic field to said data storage means;
(e) a source of new information for storing on said data storage means;
(f) means for initiating said means to apply a write pulse when said sensed information and said new information are different, said means to apply a first and second magnetic field being applied in substantial coincidence.

14. The combination in accordance with claim 13 wherein said data storage means is a non-destructive thin film element.

15. In combination,
(a) a non-destructive read out thin film data storage device having a read, write and sense circuits coupled thereto;
(b) first means for energizing the read circuit to read out the data stored in said data storage device during a read cycle;
(c) second means coupled to said sense circuit to store the data read out of said data storage device;
(d) third means for energizing the write circuit to write new information into said data storage device;
(e) further means coupled to said second and third means to actuate said third means only when the new information to be recorded is different from the previously stored information.

References Cited by the Examiner

UNITED STATES PATENTS

| | | | |
|---|---|---|---|
| 3,017,610 | 1/1962 | Auerbach et al. | 340—172.5 |
| 3,185,823 | 5/1965 | Ellersick et al. | 235—154 |
| 3,185,824 | 5/1965 | Blasbalg et al. | 235—154 |
| 3,223,982 | 12/1965 | Sacerdoti et al. | 340—172.5 |

FOREIGN PATENTS

| | | |
|---|---|---|
| 786,721 | 11/1957 | Great Britain. |

ROBERT C. BAILEY, *Primary Examiner.*

P. J. HENON, Jr., *Assistant Examiner.*